United States Patent [19]
Murphy et al.

[11] Patent Number: 5,541,608
[45] Date of Patent: Jul. 30, 1996

[54] HYBRID AMPLITUDE/PHASE COMPARISON DIRECTION FINDING SYSTEM

[75] Inventors: Myles P. Murphy; Lionel N. Menegozzi, both of Annandale; Albert C. Harding, Stockholm, all of N.J.

[73] Assignee: ITT Corporation, New York, N.Y.

[21] Appl. No.: 412,461

[22] Filed: Mar. 29, 1995

[51] Int. Cl.⁶ .................................................. G01S 5/04
[52] U.S. Cl. .................................... 342/442; 342/174
[58] Field of Search .................................. 342/442, 432, 342/174

[56] References Cited

U.S. PATENT DOCUMENTS

| | | |
|---|---|---|
| 3,824,595 | 7/1974 | Hall. |
| 3,964,065 | 6/1976 | Roberts et al.. |
| 4,788,548 | 11/1988 | Hammerquist ........................... 342/458 |
| 5,321,410 | 6/1994 | Hipp et al. ............................... 342/442 |

Primary Examiner—Theodore M. Blum
Attorney, Agent, or Firm—Plevy & Associates; Patrick M. Hogan

[57] ABSTRACT

A hybrid amplitude/phase comparison direction finding system for aircraft, employing a unique calibration system to compensate for tolerance variations in the antennas. The calibration system utilizes a programmable read only memory (PROM) for each antenna pair, wherein calibration data from pre-measured antenna patterns of the associated antennas are stored. The calibration data preferably includes measured relative amplitude (electromagnetic field strength) and phase data, as a function of frequency and angle from a common reference plane, for the associated antenna pair. This calibration data is stored in a PROM which is preferably disposed within an assembly which includes the antenna pair. A system processor can then retrieve the calibration data during system operation, whereupon angle of arrival measurements can be performed with improved accuracy.

20 Claims, 11 Drawing Sheets

| FREQUENCY (fcal) | θ | ΔG(θ)= $G_1(\theta) - G_2(\theta)$ | ΔΦ(θ)= $\Phi_1(\theta) - \Phi_2(\theta)$ |
|---|---|---|---|
| fMIN | $-\theta_V/2$ | VALUE | VALUE |
| | $-\theta_V/2 + \Delta\theta$ | VALUE | VALUE |
| | ⋮ | ⋮ | ⋮ |
| | $+\theta_V/2$ | VALUE | VALUE |
| fMIN $+\Delta f$ | $-\theta_V/2$ | VALUE | VALUE |
| | $-\theta_V/2 + \Delta\theta$ | VALUE | VALUE |
| | ⋮ | ⋮ | ⋮ |
| | $+\theta_V/2$ | VALUE | VALUE |
| ⋮ | ⋮ | ⋮ | ⋮ |
| fMAX | $-\theta_V/2$ | VALUE | VALUE |
| | $-\theta_V/2 + \Delta\theta$ | VALUE | VALUE |
| | ⋮ | ⋮ | ⋮ |
| | $+\theta_V/2$ | VALUE | VALUE |

*FIG. 6*

| FREQUENCY (fcal) | θ | AMPLITUDE SLOPE (m) | INTERCEPT ANGLE (θint) | dMEAS (f,θ) |
|---|---|---|---|---|
| fMIN | −θv/2 | VALUE | VALUE | VALUE |
|  | −θv/2 +Δθ |  |  | VALUE |
|  | +θv/2 |  |  | VALUE |
| fMIN +Δf | −θv/2 | VALUE | VALUE | VALUE |
|  | −θv/2 +Δθ |  |  | VALUE |
|  | +θv/2 |  |  | VALUE |
| fMAX | −θv/2 | VALUE | VALUE | VALUE |
|  | −θv/2 +Δθ |  |  | VALUE |
|  | +θv/2 |  |  | VALUE |

FIG. 9

HYBRID AMPLITUDE/PHASE COMPARISON DIRECTION FINDING SYSTEM

This invention was conceived and developed for the U.S. Army under U.S. Government Contract #DAAB07-94-C-M504.

FIELD OF THE INVENTION

The present invention relates generally to a direction finding system for aircraft. More particularly, it relates to a system which compares the amplitude and phase of electromagnetic signals propagating from the aircraft and received by different ground antennas to determine the aircraft's angle of arrival.

BACKGROUND OF THE INVENTION

Two basic direction finding (DF) techniques have been widely used in the prior art to measure the angular coordinates of incoming aircraft. Both techniques employ two or more antennas to receive an electromagnetic signal transmitted by the aircraft or otherwise propagating from the aircraft's location. The signals received by the different antennas are then compared, whereupon the angular position of the aircraft is computed by a processor.

The first of these techniques, designated the Amplitude Comparison system, compares only the relative amplitude of the signals received by the different antennas. This approach is the least costly but also the least accurate one. Basically, a pair of antennas on an aircraft carder or ground location having beams that overlap in space are employed to simultaneously but independently receive the aircraft's signal, as shown in FIG. 1. The shown antennas A1 and A2, typically spiral antennas, have apertures squinted off the boresight axis (the x axis) at angles +θs and −θs, respectively. An incoming aircraft 10 approaching at an angle θ from the xz plane, transmits an RF signal that is received by the antennas A1 and A2. The shown orientation of the antennas A1 and A2 results in the antenna patterns $G_1(\theta)$ and $G_2(\theta)$ depicted in FIG. 2. These antenna patterns are typically broad with 3 dB beamwidths generally greater than 60°. As such, a mathematical function can easily be derived which simulates these patterns. The measured amplitude (electromagnetic field strength) of the signals received by the antennas A1 and A2 can then readily be compared to one another to determine the azimuth angle θ of the aircraft relative to the ground location of the antennas. This is basically accomplished by means of a receiver 12, an amplitude comparison circuit 14 that converts the amplitude difference between the two signals to a digital word, a frequency detector 17 to detect the signal frequency and provide a digital word representing the same, and a processor 16. Stored in a memory within the processor 16 are the mathematical functions modelling the antenna patterns $G_1(\theta)$ and $G_2(\theta)$ as a function of frequency. The processor 16 then utilizes the digital word information as variables in the equations to compute the actual angle of arrival θ.

While the Amplitude Comparison system just described is relatively simple and cost effective, its accuracy is typically on the order of 20 degrees which is rather poor. Accuracy is basically limited as a result of the inability to accurately measure small differences in amplitude between the received signals and due to inaccuracies in the mathematical models for the antenna patterns. Even if generalized ROM look up tables are used by the processor 16 for more precise antenna pattern information based on typical measured patterns at the factory, the variation in the actual patterns from antenna to antenna due to manufacturing tolerances will still cause significant inaccuracies.

The more precise, albeit complex prior art direction finding approach is known as phase interferometry or phase comparison. This technique is illustrated in FIG. 3, where antennas 20, 22 separated by a distance "d" independently receive the transmitted RF signal from the aircraft 10. With this approach, the planar apertures of the antennas 20, 22 lie in the same plane rather than being squinted away from one another. To determine azimuth positions, the antennas 20, 22 would be positioned on the y axis (of FIG. 1); to determine elevation angles, they would lie on the z axis. For the azimuth case, a plane wave propagating from an aircraft arriving at an angle θ from boresight (the x axis) is received by each of the two antennas 20 and 22. The phase difference Δϕ between the signals received by the two antennas is expressed as $$\Delta\phi = (2\pi d \sin\theta)/\lambda \quad (1)$$

where λ is the wavelength of the signal propagating from the unknown aircraft location. This is illustrated geometrically by drawing from antenna 22, a line 25 representing the phase front of the incident plane wave. The plane wave travels an extra distance l=d sin θ to reach antenna 20 as compared to antenna 22—thus the phase of the signal received by antenna 20 lags accordingly. The phase of the two received signals are compared by a phase comparator 23 and then frequency detected, with the results supplied to a processor 27 where the azimuth angle θ of the aircraft is readily computed from eqn. (1). By employing a third antenna (not shown) positioned along the z axis and having an aperture facing a direction parallel to the x axis, the elevation angle of the aircraft can similarly be computed by virtue of the phase relationship of the signal received by the third antenna with respect to that of either antenna 20 or 22, whichever is directly below the third antenna.

The primary drawback of the phase interferometer approach is that more than one angular position of the aircraft can produce the same phase relationship between the signals received by the two antennas. Consequently, ambiguities in angular position will result with the two antenna approach. The ambiguity problem can be solved by employing one or more additional antennas or pairs of antennas with different baseline spacings between these additional antennas. Ambiguities are then resolved by comparing electrical phase between several pairs of antennas. Once the ambiguities are eliminated, the angle of arrival accuracy of the phase interferometry system is high—better than 0.5 degree accuracy has been reported. However, finding adequate installation locations for the extra antennas renders this type of system impractical for small aircraft platforms.

As a compromise between the simple but inaccurate amplitude comparison system and the highly accurate but space inefficient phase interferometer system, a hybrid amplitude/phase comparison system was developed by ITT Corporation, the assignee herein. This system utilizes a pair of squinted antennas as in the amplitude comparison approach of FIG. 1. Using only this antenna pair, both a phase and an amplitude comparison between the two received signals are performed. The amplitude comparison is used to resolve the ambiguities in the arrival angle computed by virtue of the phase comparison. This hybrid approach results in accuracies on the order of 1–5 degrees.

Accordingly, it would be desirable to further improve the angle of arrival accuracy of such a hybrid amplitude/phase comparison system without the need for additional antenna space.

It is therefore an object of the present invention to provide a direction finding system employing the hybrid amplitude/phase comparison technique, with improved angle of arrival accuracy.

SUMMARY OF THE INVENTION

The present invention improves the angle of arrival accuracy of a hybrid amplitude/phase comparison direction finding system for aircraft, by employing a unique calibration system to compensate for tolerance variations in the antennas. The calibration system utilizes a programmable read only memory (PROM) for each antenna pair, wherein calibration data from pre-measured antenna patterns of the associated antennas are stored.

The calibration data preferably includes measured relative amplitude (electromagnetic field strength) and phase data, both as a function of frequency and angle from a common reference plane, for the associated antenna pair. The PROM storing the calibration data is advantageously disposed within a housing attached to the antenna pair. A system processor can then retrieve the calibration data during system operation, whereupon angle of arrival measurements can be performed with improved accuracy using look up tables therein.

BRIEF DESCRIPTION OF THE FIGURES

For a full understanding of the present invention, reference is had to an exemplary embodiment thereof, considered in conjunction with the accompanying drawings wherein like reference numerals designate like features, for which:

FIG. 6 illustrates tables of calibration data stored in the PROM of FIG. 4;

FIG. 9 depicts tables of alternative calibration data stored in the PROM of FIG. 4;

DETAILED DESCRIPTION OF THE INVENTION

Figure 1:
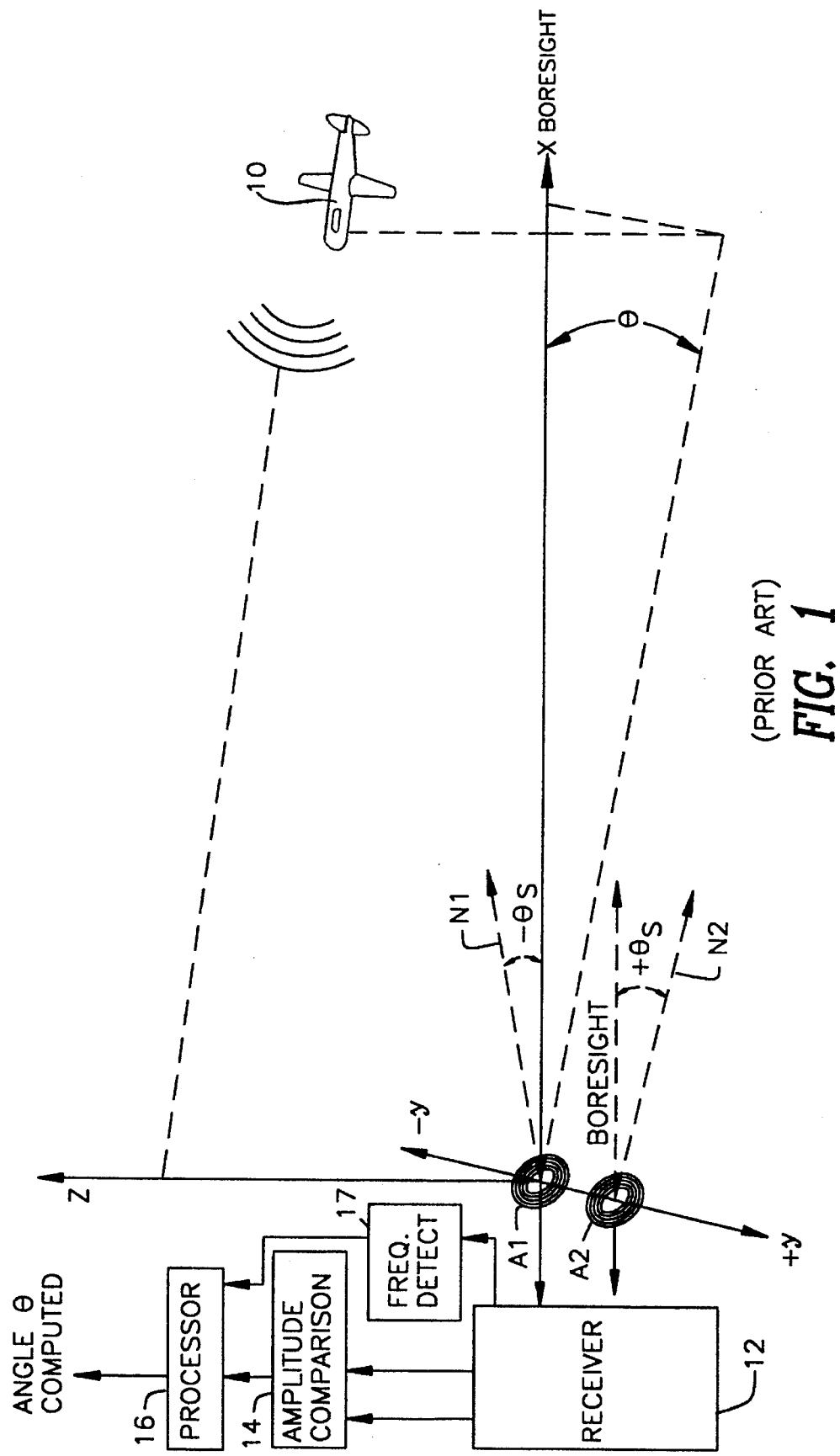
FIG. 1 illustrates a prior art amplitude comparison direction finding system.
Figure 4:
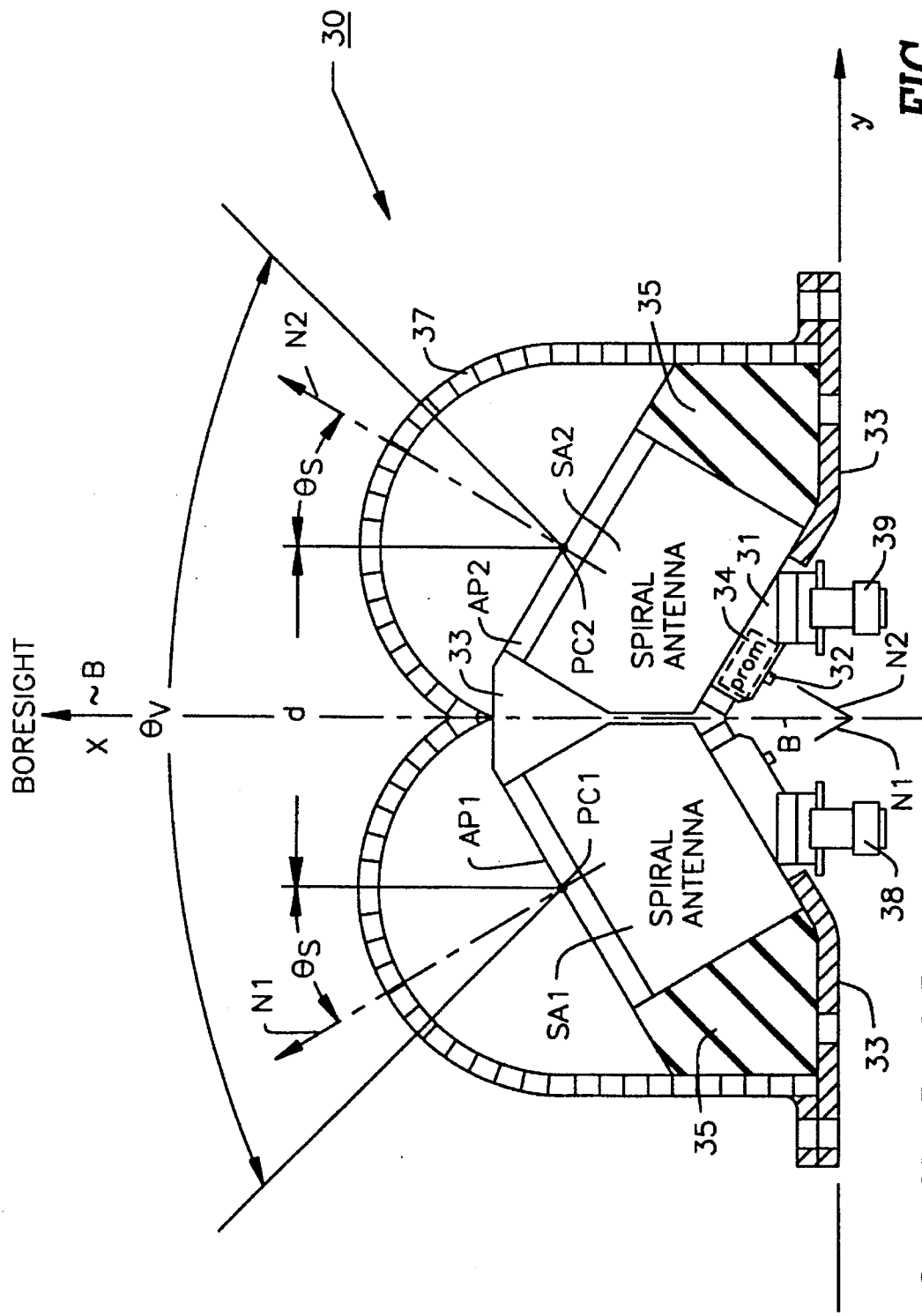
FIG. 4 shows a quasi-sectional view of a pair of squinted beam antennas along with a PROM containing calibration factors to be used with the present invention direction finding system.

Referring to FIG. 4, there is shown an antenna assembly 30 including a pair of cavity backed spiral antennas SA1 and SA2 positioned in a fixed relationship to one another by means of a frame member 33. These antennas SA1 and SA2 will be used to independently receive an electromagnetic plane wave propagating from an aircraft position in a manner similar to that illustrated in FIG. 1. Upon receiving the two signals, the circuitry of the present invention to be described compares both the amplitude and the phase of the two signals received by the respective antennas. Then, with the use of a unique calibration technique employing a PROM 34 housed within the antenna assembly 30, tolerance errors of the antennas SA1 and SA2 and associated transmission line cabling are largely eliminated whereby superior direction finding accuracy is achieved.

Figure 2:
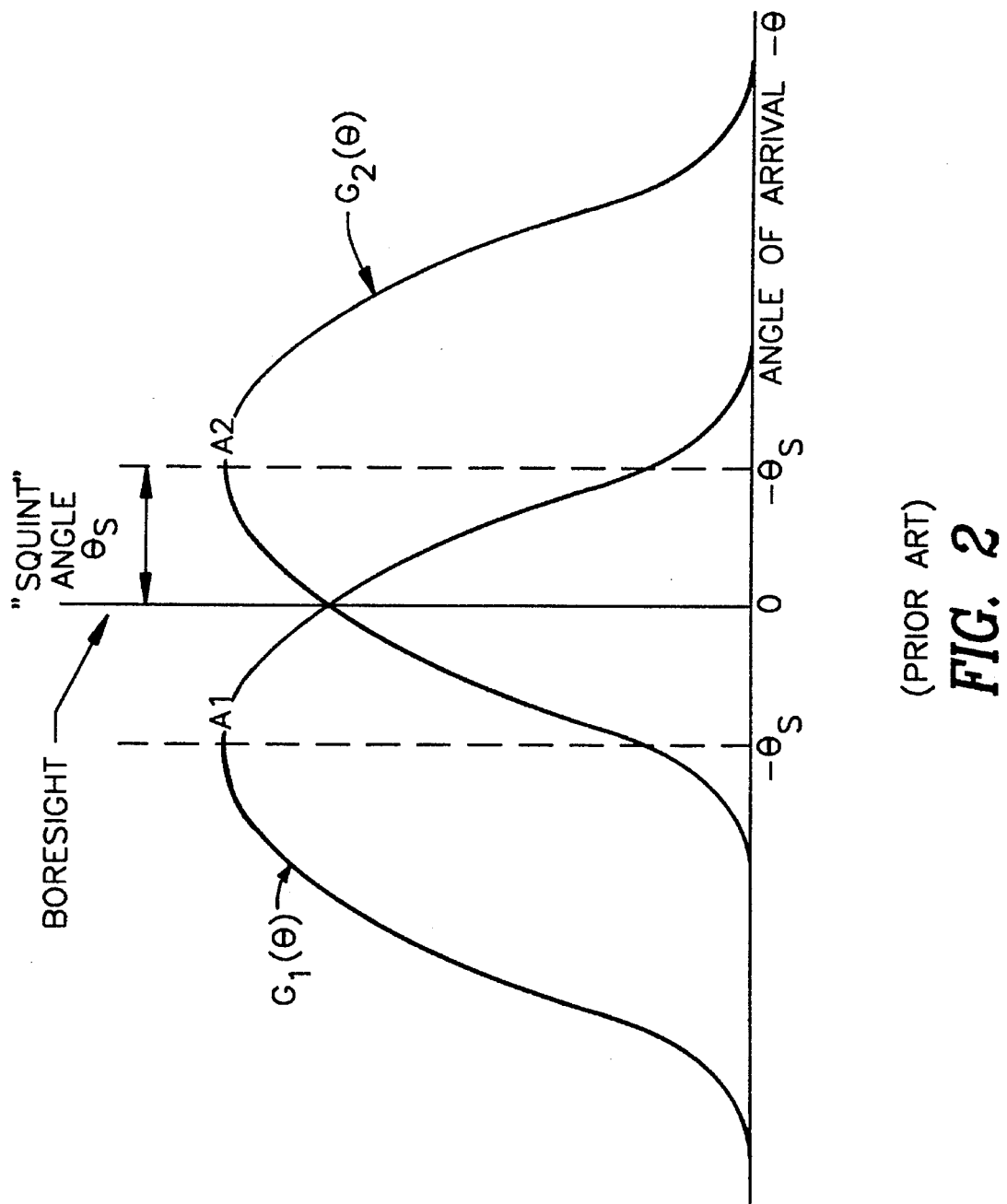
FIG. 2 shows antenna patterns of the antennas of FIG. 1.

The antennas SA1, SA2 have respective apertures AP1, AP2 which contain the spiral antenna radiating elements. With reference to a boresight axis B running between the antennas SA1 and SA2, a normal axis N1 can be drawn perpendicular to the aperture AP1; normal axis N2 is drawn perpendicular to AP2. It is thus seen that the apertures AP1, AP2 are each squinted off the boresight axis B (and off the xz plane where the z axis runs through the paper) by a squint angle θs. Since the spiral antennas SA1 and SA2 each have a broad antenna beam pattern with a beam center pointing along the respective normal axis N1 or N2, the beams will overlap in space in the same manner as is shown in FIG. 2. That is, the antennas SA1 and SA2 can be envisioned in the orientations of the antennas A1 and A2, respectively, of FIG. 1, with the x and y axis of FIG. 4 rotated 90° to correspond with the x and y axis of FIG. 1, and with the normals N1 and N2 of the respective apertures corresponding exactly in both FIGS. 1 and 4. With this orientation, the antennas SA1 and SA2 would be positioned for azimuth angle of arrival measurements. For example, if each antenna SA1 and SA2 has a 3 dB beamwidth of approximately 70° and is oriented off boresight at a squint angle θs of about 35°, an angular field of view $θ_v$ on the order of 100° can be achieved from the antenna pair. Full 360° azimuthal coverage would then be obtainable using four pairs of squinted beam antennas, with each pair dedicated to a 90° angular sector and with some overlapping coverage between adjacent sectors.

It should be noted that the antennas SA1 and SA2 are preferably of the same dimensions which would yield identical antenna patterns in all planes absent manufacturing tolerance variation. For example, where azimuth angle of arrival measurements are to be performed, the antenna patterns of antennas SA1 and SA2 should be nearly identical in the elevation plane. This will minimize azimuth angle measurements that undesirably vary as a function of the aircraft's altitude. In addition, the polarization is preferably circular which is advantageous for applications in which the polarization of the signals originating from the aircraft is unknown. The use of circular polarization by the antennas SA1 and SA2 will at least insure that about half the power of a linearly polarized wave is received. (Of course, if the signal from the aircraft is circular polarization of the opposite sense than that of the ground antennas, an undesirable cross polarized condition will occur). Accordingly, the use of spiral antennas are preferable inasmuch as they are naturally well-suited for circular polarization and have radiation patterns that are generally the same in all planes. The design of spiral antennas is well known in the art and therefore the intricate design details of the antennas SA1 and SA2 will not be elaborated upon. See, for example, chapter 14 in "Antenna Engineering Handbook", by R. Johnson, McGraw Hill Publishing Co., Third Edition for a detailed discussion on the design of spiral antennas. Advantageously, spiral antennas can easily be designed for broadband operation thereby enabling the direction finding system of the present invention to be operational over a broad frequency band. For instance, operation over a 6–18 Ghz band is possible using a pair of spiral antennas with diameters of about 1.5" separated by the distance d in FIG. 4 of approximately 3", with a 100° field of view θv. In any event, the present invention is not limited to the use of spiral antennas and other suitable antennas such as horns or small parabolic dishes can be employed, depending upon the application.

If elevation angle measurements are desired, the antenna SA1 could be mounted with its aperture AP1 facing approximately vertically (i.e., at a 90° elevation angle) while antenna SA2 faces approximately along the horizon (elevation angle of 0°). In this case, the boresight axis would be at an elevation angle of about 45° and the squint angle θs of each antenna would be about 45° from either side of the boresight axis. This configuration could be employed to cover elevation angles of arrival from 0° to 90° or greater over a given azimuth angular sector.

Whether the spiral antennas SA1 and SA2 are positioned to measure azimuth, elevation or skewed angles of arrival, the amplitude and phase of the RF energy independently received by the two antennas is compared to determine the angle of arrival θ. The phase of the two received signals are compared to each other to determine the angle θ based on the phase interferometer principles described in reference to FIG. 3. As explained previously, depending on the spacing d between the phase reference points (phase centers) of the antennas, energy received at a given phase relationship and frequency can be interpreted as originating from more than one direction θ resulting in ambiguities in the measurement. These ambiguities are resolved in the present invention by the simultaneous measurement of amplitude between the received signals using the identical antennas SA1 and SA2. As such, the present approach is generally referred to as the hybrid amplitude/phase comparison technique. Basically, with this type of hybrid system the computation of the angle θ may first be made by a processor using the phase information, whereupon at least two ambiguous angles of arrival $\theta_1$ and $\theta_2$ will be computed and stored in a memory. The calculation is then independently performed using the amplitude information to yield another angle of arrival $\theta_3$. If $\theta_3$ is closer to $\theta_1$ than $\theta_2$, the correct angle of arrival is $\theta_1$; likewise, if $\theta_3$ is closer to $\theta_2$ than it is to $\theta_1$, then $\theta_2$ is the correct angle of arrival. Since the phase measurement (absent the ambiguities) is more accurate than the amplitude measurement, there would be no advantage in averaging $\theta_3$ with either $\theta_1$ or $\theta_2$. In any event, the calibration technique of the present invention improves the direction finding accuracy of this type of system.

Figure 3:
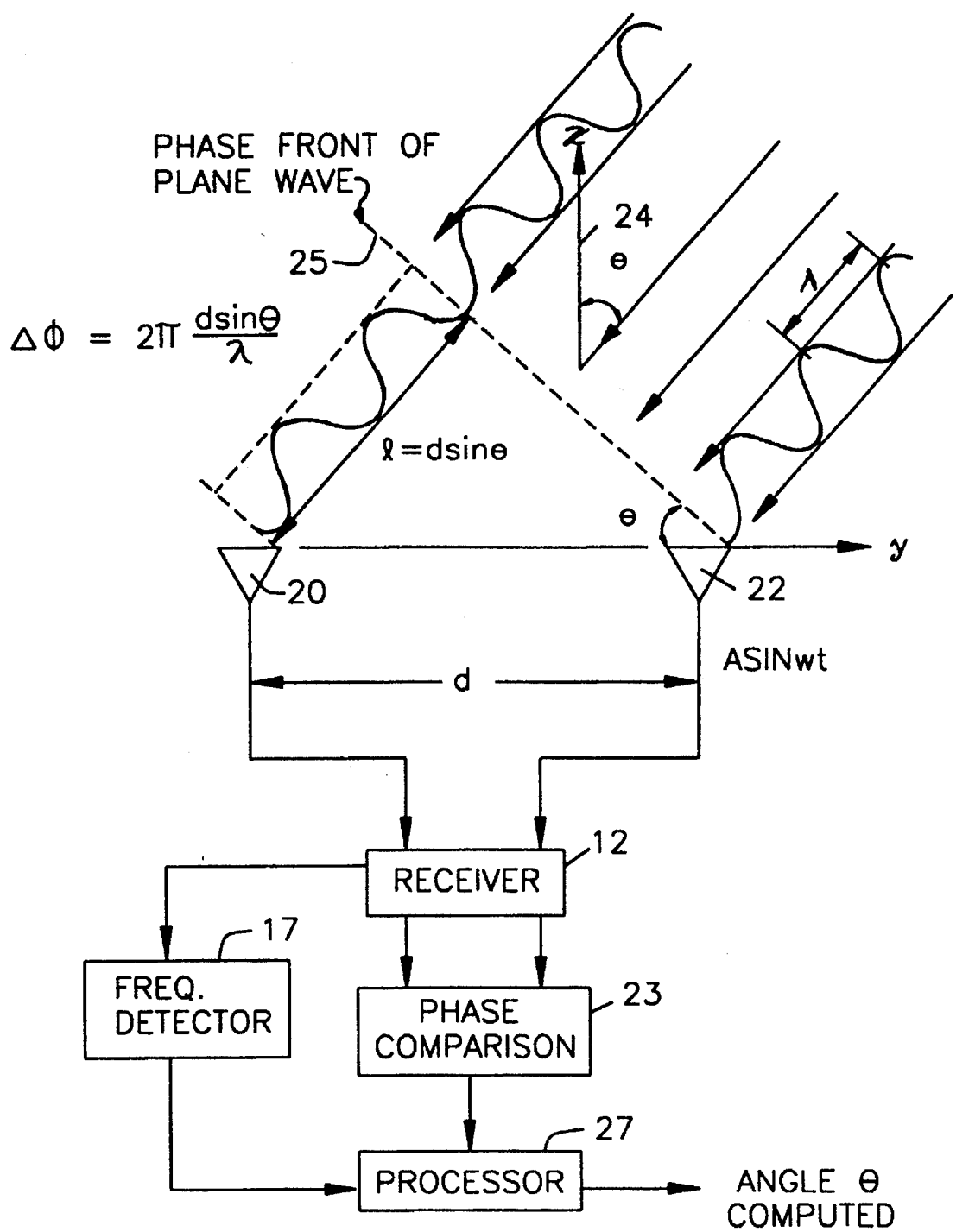
FIG. 3 illustrates a prior art phase interferometer direction finding technique.

In FIG. 3, the antennas 20 and 22 point in the same direction while the antennas SA1 and SA2 of FIG. 4 are squinted away from one another. This squinting relationship will have an impact on the relative phase measurements which will be corrected by the calibration technique of the present invention to be described. Now, the antennas SA1, SA2 have respective phase centers PC1, PC2 which are in proximity to the center of the respective apertures AP1 or AP2. By knowing the exact locations of these phase centers PC1, PC2 and the distance d therebetween, the angle of arrival θ can be computed based on the measured phase difference using equation (1). Due to manufacturing tolerances of the antennas, however, the positions of the phase centers PC1, PC2 will vary. As a function of frequency, the position of PC1 typically moves along the axis N1, while PC2 moves along N2, often in an unpredictable manner. This leads to an error in the value assumed for the distance d in the subsequent calculation, and a corresponding error in the angle θ determination.

The manufacturing tolerances of the antennas SA1 and SA2 are also the cause of insertion phase errors which lead to inaccuracies in the angle of arrival measurement. The electrical length between the antenna's phase center and the antenna input port will vary from antenna to antenna, causing an error in the relative phase measurement, and hence in the angle θ computation. Thus in FIG. 4, the electrical length between the waveguide input port 38 to the phase center PC1 will differ from that between waveguide input port 39 and phase center PC2. Phase matched cabling between the antenna input ports 38,39 and the receiver (to be described) will also have some insertion phase error and VSWR which will cause angle θ measurement error. The VSWR of the phase matched cabling will "beat" against the VSWR "looking into" the spiral antenna SA1 or SA2, adding to the overall insertion phase error at certain frequencies. Moreover, there will always be some error in the assumed spacing "d" between the assumed antenna phase centers PC1 and PC2 simply because a physical measurement can never be performed perfectly. This is another source of angle of arrival error that will be corrected by the calibration technique to be described.

Aside from the insertion phase and phase center errors, the manufacturing tolerances similarly cause unit to unit variations in the electromagnetic field strength (amplitude) patterns of the antennas. (It is noted that the term "radiation pattern" and "electromagnetic field strength pattern" are generally used interchangeably in the art. Herein, we will use the term "radiation pattern" as encompassing either an amplitude or a phase pattern, or both, as a function of angle from the antenna aperture). The angle of arrival computed for the amplitude comparison measurement will of course suffer as a result of these unit to unit variations. The calibration technique of the present invention to be described likewise substantially eliminates this source of error.

With continuing reference to FIG. 4, there is shown as part of the antenna assembly 30, a housing 31 wherein the PROM 34 is housed. The PROM 34, preferably an EEPROM, stores amplitude and phase calibration data for the antenna pair SA1, SA2. The processor to be described retrieves this data for use in the angle of arrival determination, whereby the amplitude and phase errors discussed above are largely eliminated.

The antenna assembly 30 also includes a radome 37 and an annnular section of absorbing material 35 to reduce the reception of RF energy incident from beyond the field of view $\theta_v$ of interest. As a result, signal to noise ratio is enhanced.

Figure 5:
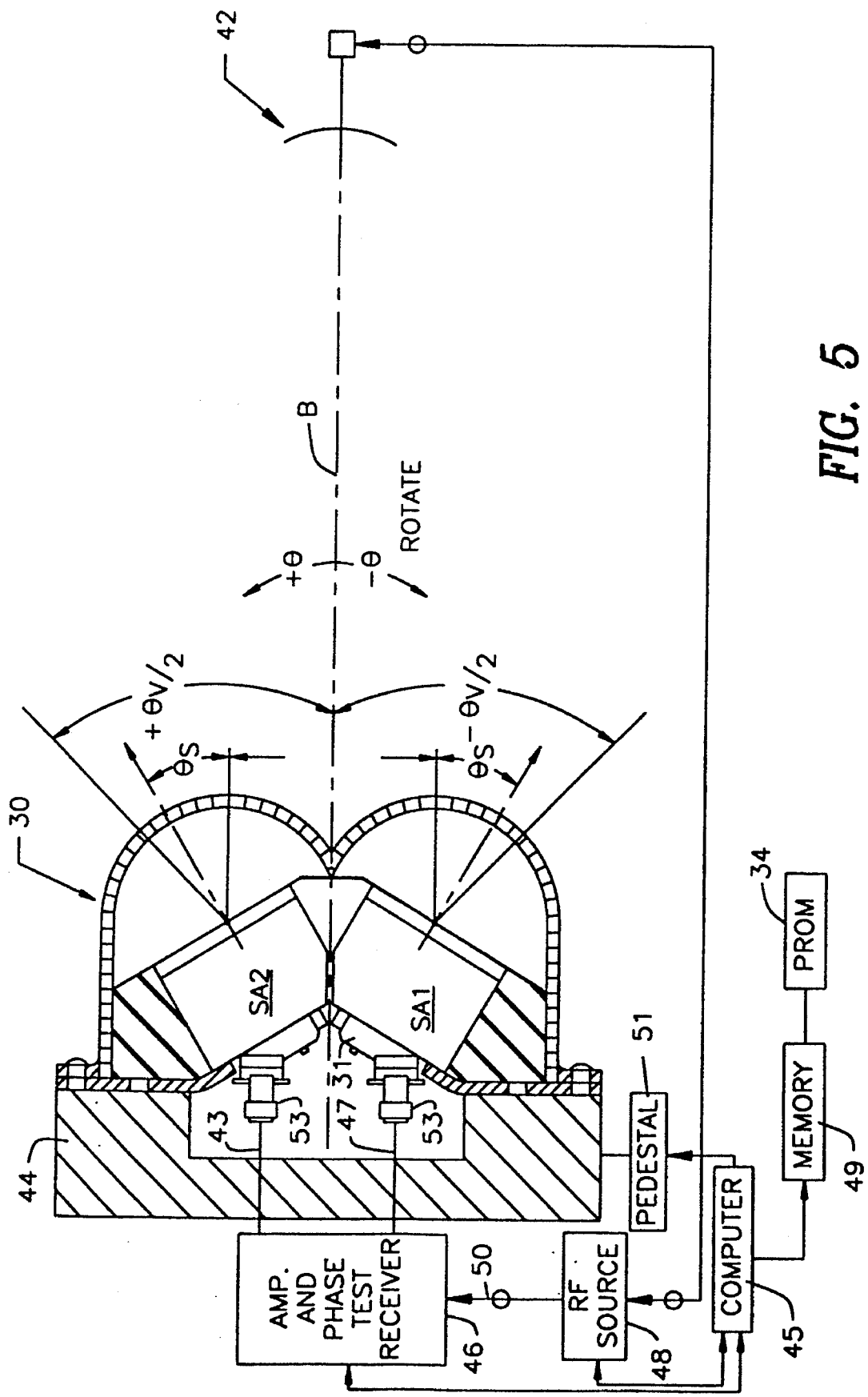
FIG. 5 depicts an amplitude and phase pattern measurement on the antennas of the present invention.

Referring now to FIG. 5, there is shown a test set-up to measure the relative far field amplitude and phase patterns of the antennas SA1 and SA2 as a function of the angle θ and of frequency. In an anechoic chamber or suitable outdoor antenna test range, the antenna assembly 30 is bolted to a test mount 44 which is affixed to a rotating pedestal 51 (shown schematically for convenience). A transmitting test antenna 42 transmits RF energy towards the antenna assembly 30 at discrete frequencies over a desired frequency band. The antenna assembly 30 is rotated off the boresight axis B to enable amplitude and phase patterns to be measured as a function of the angle θ. Basically, the measurement of far field amplitude and phase patterns via computer control is well known to those skilled in the art. A state of the art antenna testing facility including a computer 45, an RF source 48, the pedestal 51 and an amplitude and phase test receiver 46 is readily available from the Scientific Atlantic Corporation of Atlanta, Ga. Systems are available which take simultaneous data over a desired frequency band of interest at discrete rotational angles θ so that the entire measurement over the entire frequency band can be performed for a given angular sector in just one rotation over that sector.

In any event, a pair of phase matched (i.e., same electrical length) coaxial cables 43,47 are coupled to the respective antennas SA1, SA2 via waveguide to coaxial adapters 53. The other end of each cable 43 or 47 will connect directly into the system receiver (to be described hereinafter) and therefore it is desirable to perform the calibration measurement of the antenna assembly 30 to the ends of the cables 43 and 47 which will eliminate the phase and amplitude errors of these cables as well. As the amplitude and phase data is being taken under control of the computer 45, the data is stored in a memory 49 which can be the hard drive of the computer 45 or an external floppy disk. At a later time, this data is downloaded to the PROM 34 which is then mounted within the housing 31 of the antenna assembly 30.

The amplitude and phase test receiver 46 may be configured to measure the far field radiation patterns of antennas SA1 and SA2 either one at a time or simultaneously, the latter being the preferred approach. In the former case, the test receiver 46 would equipped with a switch (not shown), controlled by the computer 45, to switch between antennas SA1 and SA2 after one complete angular sweep over the desired angular field of view θv. Then, a program within the computer 45 can subtract the difference between the patterns to provide relative phase and amplitude between SA1 and SA2 as a function of frequency and angle θ. This relative data is stored within the memory 49. In the latter, simultaneous measurement case, the test receiver 46 would include phase and amplitude comparators (not shown) to provide relative amplitude and phase data to the computer 46, which relative data is then stored in the memory 49.

It will be appreciated by those skilled in the art that while the antenna assembly 30 is shown for convenience in FIG. 5 to be rotated in the elevation direction to measure relative amplitude and phase vs. θ, the radiation patterns are preferably taken in azimuth. Indeed, by envisioning the set-up of FIG. 5 as a top view rather than a side view, the shown rotation would be in azimuth. This azimuth arrangement is preferable to avoid phase errors which could otherwise occur with rotation in elevation when the center of rotation of the pedestal 51 does not exactly coincide with that of the antenna assembly 30. Azimuth rotational measurement for the calibration data is preferred whether the antenna assembly 30 is employed in the final configuration to measure azimuth, elevation or skewed angle of arrivals of incoming aircraft. It should also be understood that in any case, a phase reference is provided from the RF source 48 to the test receiver 46 via the RF cable 50 to enable proper measurement of phase.

Turning now to FIG. 6, there is shown a memory table storing the desirable data gleaned from the antenna test of FIG. 5 and stored in the PROM 34. Over a frequency band ranging from fmin to fmax in intervals of Δf, and over angles of θ ranging from −θv/2 to +θv/2 in intervals of Δθ (where θv is the desired angular field of view), a data value is stored for a corresponding relative amplitude $\Delta G(\theta) = G1(\theta) - G2(\theta)$ and a corresponding relative phase $\Delta \Phi(\theta) = \Phi1(\theta) - \Phi2(\theta)$. (The functions G1(θ) and G2(θ) represent the far field electromagnetic field strength (amplitude) patterns of the antennas SA1 and SA2, respectively. The functions Φ1(θ) and Φ2(θ) represent the far field phase patterns of the respective antennas SA1 and SA2 as a function of θ with respect to an arbitrary phase reference). Of course, the range fmin–fmax of the frequency band used in conjunction with the step intervals Δf and Δθ will dictate the memory storage capacity required for the PROM 34. PROMS are widely available commercially from many manufacturers and one skilled in the art can readily select and "burn in" a suitable PROM 34 with the data stored in the memory 49.

Figure 7:
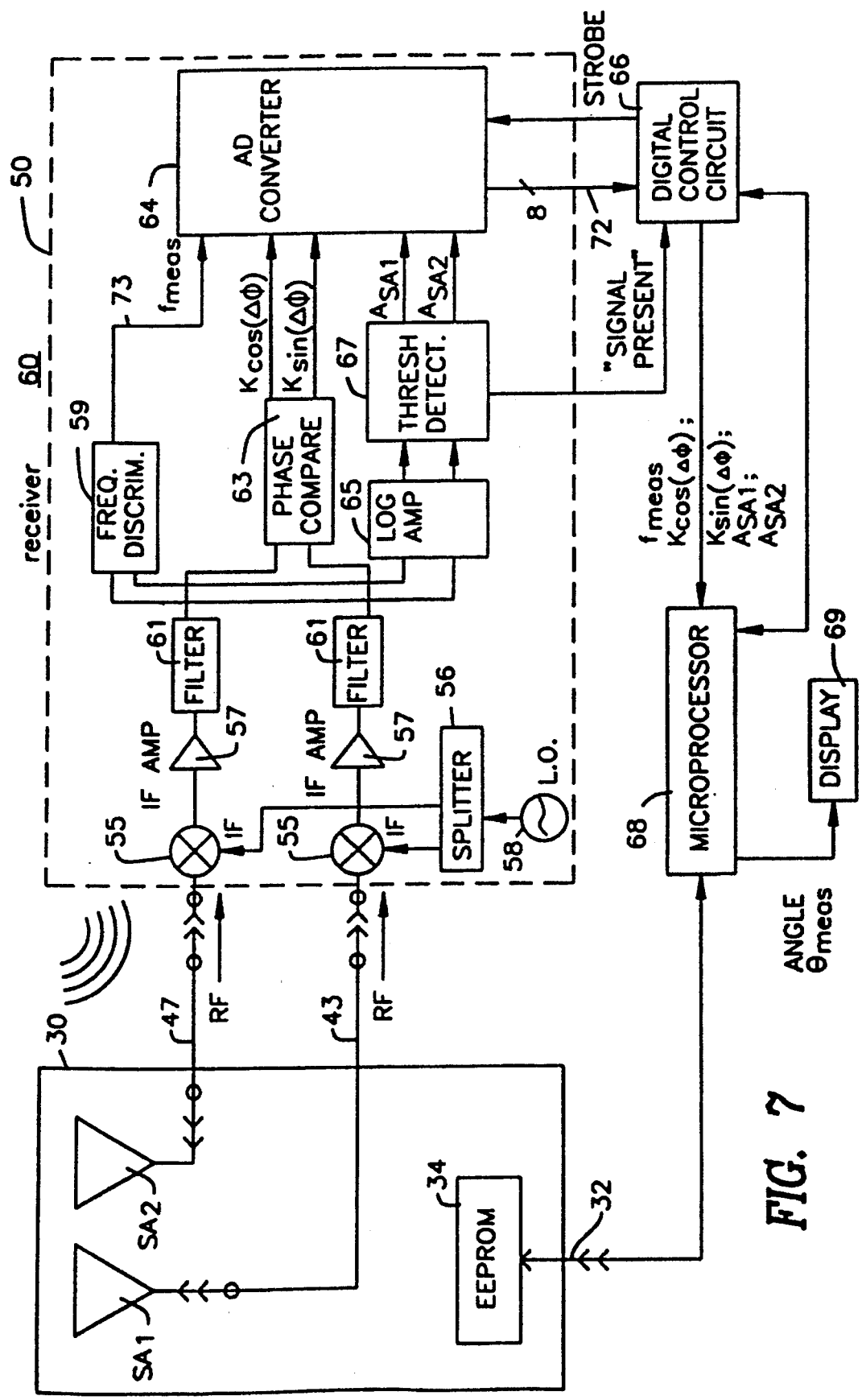
FIG. 7 is a block diagram of the hybrid amplitude/phase direction finding system of the present invention.

Referring now to FIG. 7, the antenna assembly 30 is schematically shown integrated into a hybrid amplitude/phase comparison direction finding system 60 according to the present invention. The phase matched cables 43 and 47 connect directly into a receiver 50 that includes a local oscillator 58, a 1:2 splitter 56, a pair of mixers 55 and a pair of intermediate frequency (IF) amplifiers 57. The local oscillator 58 may be a frequency synthesizer controlled by the processor 68. This will allow for versatility in intercepting different types of signals from various aircraft such as pulse, pulse Doppler or CW type signals. When searching for a CW signal, the local oscillator 58 will be chopped; therefore, any CW signal will appear as a pulsed signal at the chopper rate in the IF. The IF amplifiers 57 are followed by bandpass filters 61 whose outputs are coupled to a phase comparison circuit 63, a log amplifier circuit 65 and a frequency discriminator 59. The log amplifier 65 converts the incoming IF to a pair of log video signals which are provided to a threshold detector 67. The threshold detector 67 provides a TTL level "signal present" signal to a digital control circuit 66 whenever both video input signals exceed a predetermined threshold. Only when the threshold is exceeded will angle of arrival measurement data be evaluated by the processor 68.

The threshold detector 67 then provides a pair of video output signals $A_{SA1}$ and $A_{SA2}$ to an analog to digital (A/D) converter 64. The output signal $A_{SA1}$ is a voltage level corresponding to the field strength of the signal received by antenna SA1; likewise, the signal $A_{SA2}$ is a voltage level corresponding to the field strength of the signal received by antenna SA2. The A/D converter 64 digitizes the $A_{SA1}$ and $A_{SA2}$ signals received and provides the digitized information as digital words to the digital control circuit 66 on one of a plurality of output bit lines 72.

Simultaneously, the phase comparator 63 compares the phase of the two incoming IF signals and provides a pair of voltage levels of values K cos Δϕ and K sin Δϕ to the A/D converter 64, where K is a predetermined constant and Δϕ is the difference in phase between the two RF signals received by the antennas SA1 and SA2 (which is the same difference in phase between the two IF signals at the filter 61 outputs). This relative phase is provided in terms of a sine and a cosine in order to assure operation in a linear range, as is common with conventional phase comparators. In addition, a frequency discriminator 59 is employed to determine the frequency "fmeas" of the signals received by the antennas SA1, SA2 (by measuring the IF frequency). A voltage level representing the detected frequency fmeas is then supplied on line 73 to the A/D convertor 64 where it is digitized, as are the phase comparator 63 outputs, each being converted to an 8 bit digital word appearing on one of the output lines 72.

Figure 8:
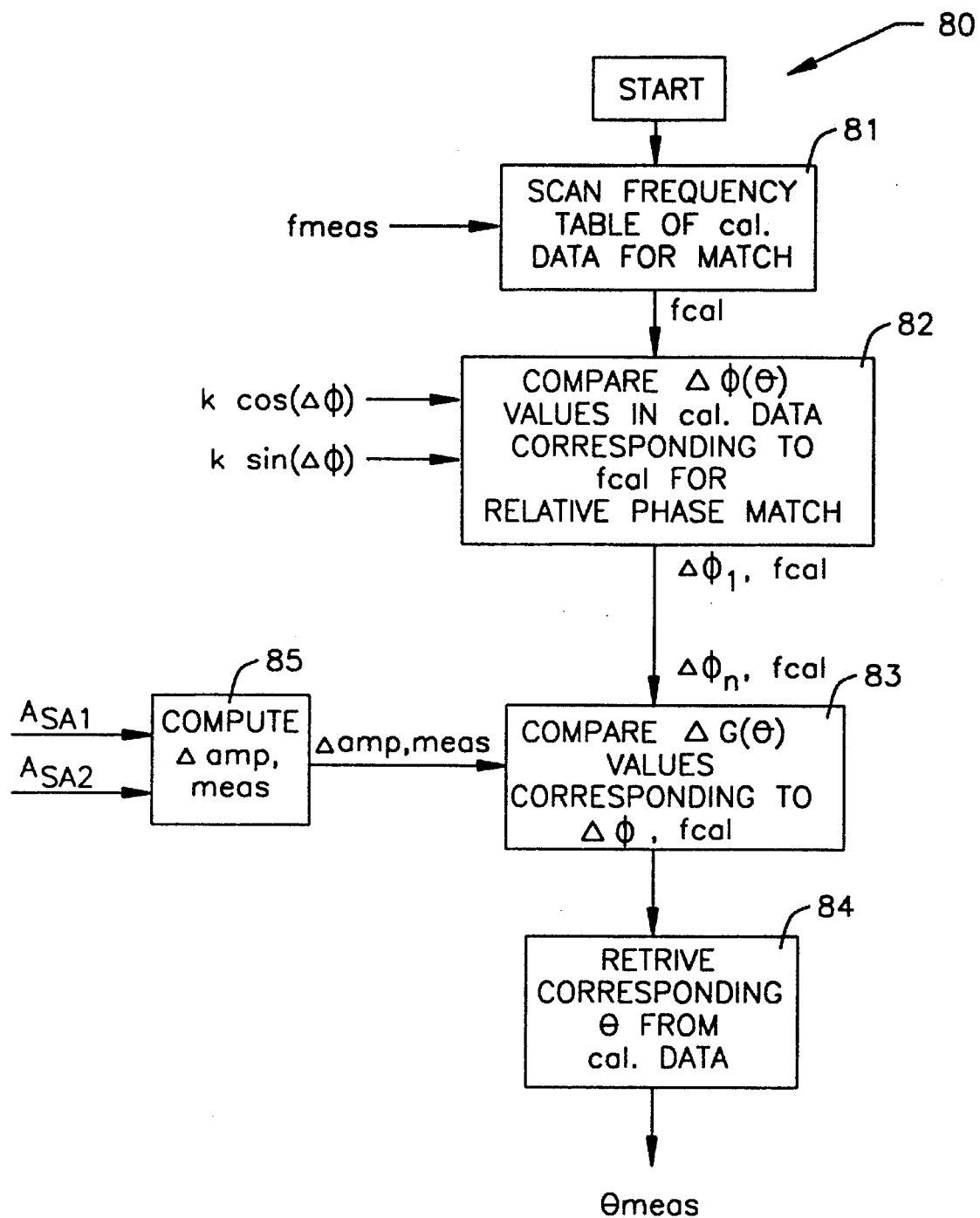
FIG. 8 is a flow diagram depicting steps in a software routine to determine the measured angle of arrival according to the invention.

The digital control circuit 66 provides the digital words representing the frequency fmeas, the amplitudes $A_{SA1}$ and $A_{SA2}$ and the relative phase values K sin Δϕ and K cos Δϕ to the microprocessor 68. The microprocessor 68 then retrieves the calibration data stored in the PROM 34 (as tabulated in FIG. 6) to arrive at a measurement for the angle of arrival as follows. Using the software routine 80 illustrated by the flow diagram of FIG. 8, the microprocessor 68 first scans the frequency table of the calibration data in step 81 to locate the frequency "fcal" closest to the measured frequency "fmeas" of the received signals. Thereafter in step 82, the measured relative phase Δφ between the two antennas SA1, SA2 as determined from the values K cos Δφ and K sin Δφ, is compared to the values in the ΔΦ table corresponding to fcal. As explained previously, there may be several identical relative phase values $\Delta\Phi_1, \ldots \Delta\Phi_n$, for a given frequency fcal, with each of the identical values corresponding to a different angle θ. The angle θ must then be resolved by finding the corresponding relative amplitude value ΔG(θ), since only one unique value of G(θ) will correspond to a given angle θ. Thus in step 85, a measured relative amplitude value "Δamp,meas" is computed as the difference, in decibels, between the amplitude values $A_{SA1}$ and $A_{SA2}$. Then in step 83, the ΔG(θ) values corresponding to $\Delta\phi_1$ to $\Delta\phi_n$ are compared with the measured relative amplitude Δamp,meas for a match. The value of θ corresponding to the matching ΔG(θ) value is then retrieved in step 84 to arrive at the measured value for θ, designated "θmeas". This value is then displayed on the display 69 and/or otherwise utilized in an electronic warfare system.

Accordingly, by using the above-described technique, there is no need for the processor 68 to compute the value of θ from equation (1) as was done in the phase interferometer systems of the prior art, since the value θmeas is simply extracted from the memory table of the PROM 34. This avoids the necessity of accurately measuring the distance "d" between the aperture centers as is necessary in the pure phase interferometer approach, or in a hybrid amplitude/phase comparison approach that does not employ the calibration technique of the present invention.

Figure 10:
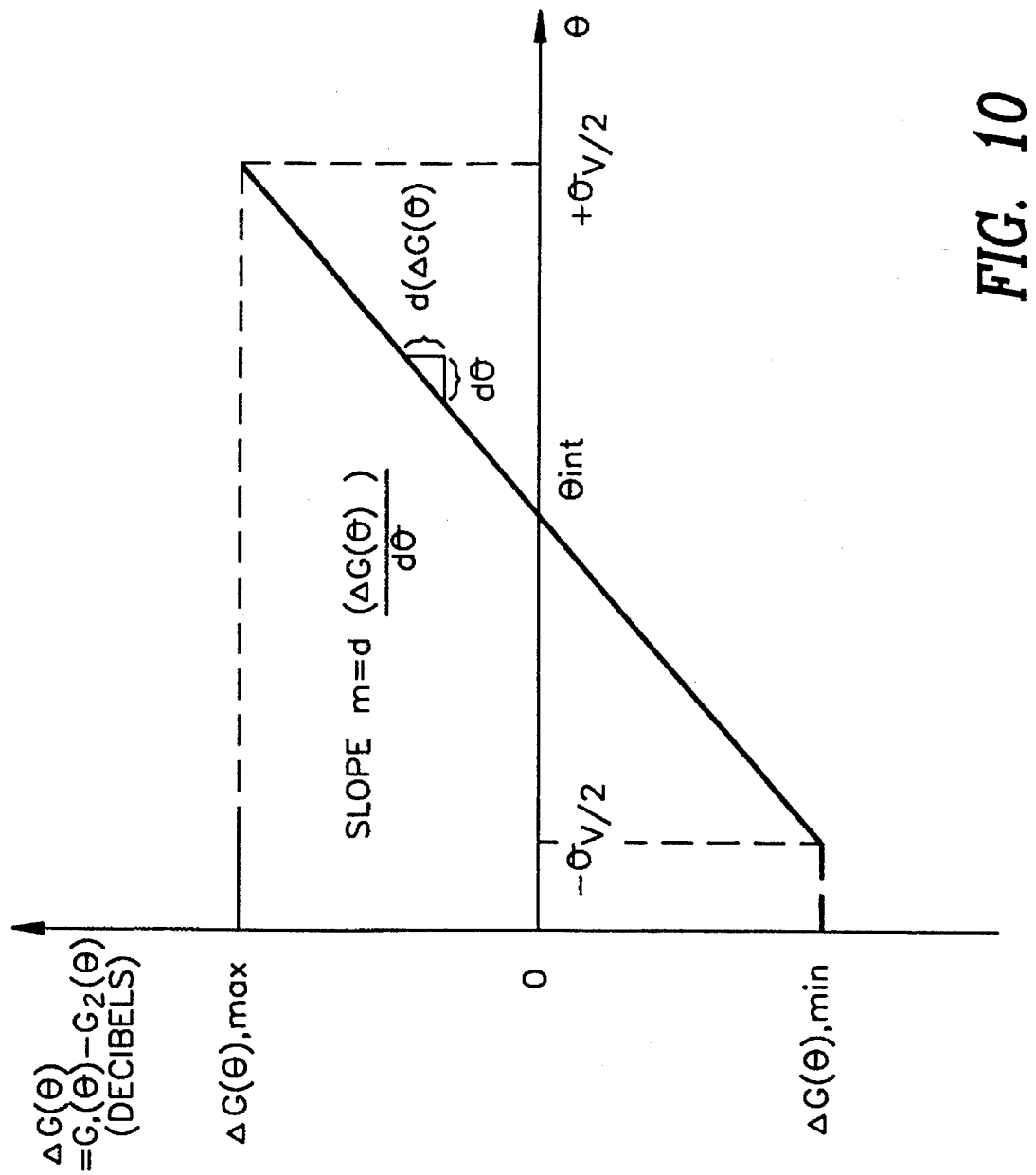
FIG. 10 is a graph illustrating a linear relative amplitude slope vs. angle.

An alternate approach to the storage of the relative phase and amplitude data in the PROM 34 and to the subsequent extraction of that data to determine the angle of arrival in the system is now presented. The dam to be stored in the PROM 34 using this approach is shown in the tables of FIG. 9. Instead of storing a distinct value of ΔG(θ) for every value of frequency fcal and of the angle θ, an amplitude slope "m" and an intercept angle "θint" is stored for every frequency fcal. These values are determined by first measuring the relative amplitude ΔG(θ)=G₁(θ)–G₂(θ) for each value of θ and fcal using the set-up of FIG. 5 in the same manner as was described above. Then, using a software routine within the computer 45, a linear approximation of the measured values of ΔG(θ), in decibels, as a function of θ is computed for each frequency fcal. Basically, the function ΔG(θ) will be an approximately linear function if the antenna patterns G₁(θ) and G₂(θ) are Gaussian, which can be easily achieved using the spiral antennas SA1 and SA2. The linear approximation will have a slope m=d(ΔG(θ)/dθ as shown in the graph of FIG. 10. In addition, there will be an intercept angle θint for each frequency fcal which represents the measured angle θ for which G₁(θ)=G₂(θ). If the antennas were ideal, this intercept angle would correspond to the boresight axis; however, tolerance variations preclude this from being the case over the frequency band. The computed values for the slope m as well as those for the measured value for θint are stored in the memory 49 and later "burned in" to the PROM 34.

The measured relative phase data may also be stored in the PROM 34 in an alternative manner as is shown in the tables of FIG. 9. Rather than storing the measured relative phase ΔΦ=Φ₁(θ)–Φ₂(θ), a value "dmeas(f,θ)" is stored for each value of fcal and θ, which represents the measured distance "d" between the phase centers PC1 and PC2 of the respective antennas SA1 and SA2. (See FIG. 4). The value dmeas(f,θ) is measured by measuring the relative phase ΔΦ between the energy received by the two antennas SA1 and SA2, and then computing dmeas(f,θ) via a software routine within the computer 45 using the equation:

$$d\text{meas}(f,\theta) = (\lambda \times \Delta\Phi)/(2\pi \sin\theta) \quad (2)$$

where ΔΦ is the measured relative phase value Φ₁(θ)–Φ₂(θ) for each frequency fcal and angle θ, and λ is the wavelength of fcal. (It is noted that eqn. (2) can be derived from eqn. (1)). The computed values for dmeas(f,θ) are then stored in the memory 49 and later burned in to the PROM 34.

Figure 11:
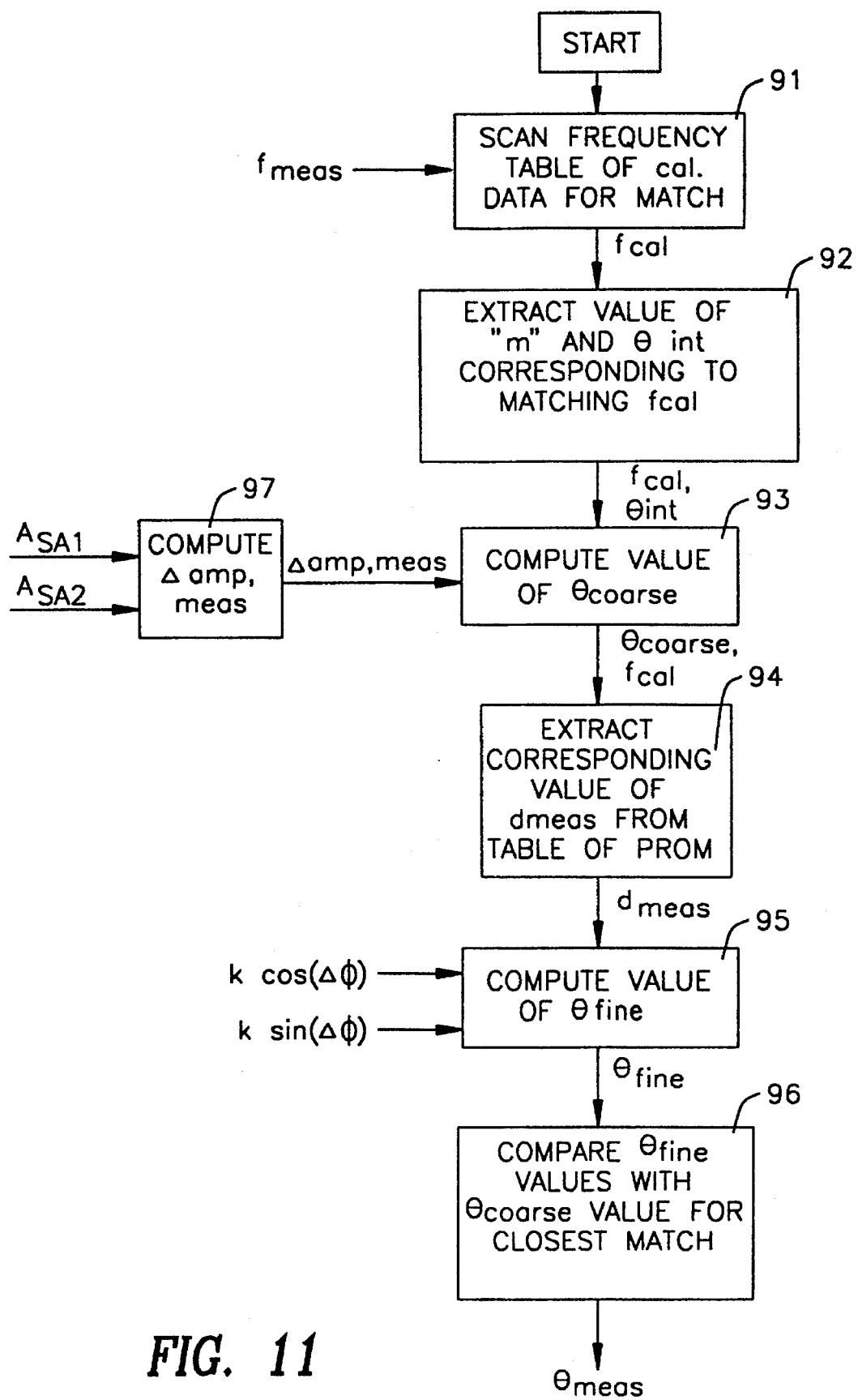
FIG. 11 is a flow diagram indicative of steps of a software routine to compute angle of arrival using the data of FIG. 9.

When the variables m, θint and dmeas (which are indicative of pre-measured relative amplitude and relative phase data) are stored in the PROM 34 as is shown in FIG. 9, the method of determining the measured angle of arrival θ in the direction finding system of FIG. 7 will be as follows. The system processor 68 will in this case employ a software routine as illustrated by the flow chart of FIG. 11. First, the measured frequency fmeas will be compared with the stored values fcal for a match in step 91. Thereafter, in step 92, the amplitude slope value "m" as well as the intercept angle θint corresponding to the matching frequency fcal will be extracted from the PROM 34. The measured relative amplitude "Δamp,meas" between the signals received by the antennas SA1 and SA2 is then computed as the difference, in decibels, between the amplitude values $A_{SA1}$ and $A_{SA2}$ in step 97. A coarse angle of arrival value "θcoarse" is then computed by the processor 68 in step 93, using the equation:

$$\theta\text{coarse} = \theta\text{int} + (\Delta\text{amp,meas})/m. \quad (3)$$

Once the value of θcoarse is computed, a corresponding value of dmeas is extracted from the dmeas table of the PROM 34 in step 94. This is accomplished by first identifying the value of θ in the table which is closest to θcoarse, and then simply extracting the value of dmeas corresponding to both the frequency fcal and to that value of θ. (An interpolation between values in the table can also be employed by the processor 68 for even more accurate results if so desired.) A fine value "θfine" for the measured angle of arrival is then computed by the processor in step 95 using the equation:

$$\theta\text{fine} = \sin^{-1}(\lambda\Delta\phi/(2\pi d\text{meas})) \quad (4)$$

where Δφ is the measured relative phase between the signals received by the antennas SA1 and SA2 during system operation as determined from the values K sin Δφ and K cos Δφ supplied to the processor 68 from the control card 66, and λ is the computed wavelength of the measured frequency fmeas. (It is noted that eqn. (4) may be derived from eqn.(1)). Since there will be several values of θfine, the final step is to resolve the ambiguities by comparing these values of θfine with the computed value for θcoarse in step 96. The value of θfine which is closest to the angle θcoarse is then the measured angle of arrival "θmeas" of the incoming electromagnetic energy. This value θmeas may then be displayed or otherwise utilized in the overall system.

While the invention hereinabove described using either of the above approaches has particular utility for measuring the angular direction of approaching aircraft where the aircraft transmits an RF signal, it will be appreciated that the invention can be used to measure the angular direction of incoming electromagnetic energy from any source. Moreover, if used to measure aircraft position, the aircraft does not need to be approaching the ground location of the antennas—only the RF signals need to be propagating towards the antennas. The aircraft also need not transmit the signals—another transmitter at the antenna ground location can bounce a signal off the aircraft for subsequent reception by the antennas SA1 and SA2.

Thus disclosed is an improved direction finding system for aircraft according to the present invention employing a hybrid phase/amplitude comparison approach in conjunction with a unique antenna calibration technique. A key advantage of the invention over the hybrid direction finding systems of the prior an is that substantially improved measurement accuracy is obtainable via the use of the calibration data, particularly relative phase data, in the measured angle determination. Another advantage of the invention is realized by the PROM 34 being disposed in the housing 31 which is pan of the antenna assembly 30. Since it is desirable for the antenna assembly 30 to be essentially a line replaceable unit, new calibration data corresponding to a new antenna assembly 30 is automatically available once the replacement occurs. Accordingly, it is not necessary to replace a memory chip in the system microprocessor 68 or to re-program the processor 68 whenever the antenna assembly is replaced or vice versa. From a logistics standpoint, this feature is highly desirable.

It will be understood that the embodiments described herein are merely exemplary and that a person skilled in the art can make many modifications and variations to the described embodiments using functionally equivalent components. For instance, while the invention has generally been described as employing spiral antennas to receive the incident electromagnetic energy, one could alternatively utilize horns, parabolic dishes, or other antennas to achieve the advantages of the present invention. All such modifications and variations are intended to be included within the scope of the invention as defined by the appended claims.

What is claimed is:

1. A system for measuring an angular position of an aircraft with respect to a reference ground location, comprising:
    a pair of antennas disposed at said ground location with each antenna of said pair having an antenna beam pointing in a different direction from the other and independently receiving electromagnetic energy propagating from the aircraft's position;
    an electronic memory having stored calibration data corresponding to premeasured amplitude and phase radiation patterns of said antennas, as a function of frequency and angle from a common reference plane;
    receiving means, coupled to said antenna pair, for converting said electromagnetic energy independently received by said antennas to a lower frequency, and for detecting the frequency of said propagating electromagnetic energy to provide a measured frequency value;
    means coupled to said receiving means, for comparing the amplitude and phase of said electromagnetic energy independently received by said antennas wherein a relative amplitude value and a relative phase value are provided; and
    processing means, coupled to said receiving means, said means for comparing, and to said memory, for determining the angular position of said aircraft from said measured frequency value, said relative amplitude value, said relative phase value and said calibration data.

2. The system according to claim 1, wherein said pair of antennas and said electronic memory are disposed within an antenna assembly independent of said processing means.

3. The system according to claim 2 wherein said electronic memory comprises a programmable read only memory (PROM).

4. The system according to claim 3 wherein said pair of antennas comprise a pair of broad beam spiral antennas of generally the same dimensions in a fixed relationship to one another, and wherein said PROM is disposed in a housing affixed to said pair of antennas.

5. The system according to claim 4, wherein said pair of antennas are affixed to one another by means of a frame member defining a central boresight axis and wherein each of said antennas have apertures squinted from said central boresight axis by a given squint angle.

6. The system according to claim 1 wherein said stored calibration data includes a table of frequencies, a table of said angle from a common reference plane corresponding to each of said frequencies and ranging from a first angular extreme to a second angular extreme, a table of measured relative amplitude data points between said pair of antennas at each of said angles and frequencies, and a table of measured relative phase data points between said pair of antennas at each of said angles and frequencies.

7. The system according to claim 6 wherein said processing means determines said angular position by matching said measured frequency with one of said frequencies stored in said table of frequencies, matching said relative phase value with at least one of said relative phase data points corresponding to said one of said frequencies, and matching said relative amplitude value with one of said relative amplitude data points corresponding to said at least one of said relative phase data points, and retrieving the angle corresponding to said relative amplitude data point matching said relative amplitude value.

8. The system according to claim 1 further including a first transmission line of a given electrical length having a first end coupled to one of said pair of antennas and a second end coupled to a first input port of said receiving means, and a second transmission line of said given electrical length having a first end coupled to the other of said pair of antennas and a second end coupled to a second input port of said receiver means, and wherein said calibration data corresponds to pre-measured amplitude and phase radiation patterns of said antennas measured to said second end of each of said transmission lines.

9. The system according to claim 8 wherein said receiver means comprises first and second mixers coupled to said input ports, a local oscillator coupled to each of said mixers, a pair of intermediate frequency (IF) amplifiers coupled to said mixers, a pair of filters coupled to said IF amplifiers, and a frequency discriminator coupled to said filters; and
    wherein said means for comparing comprises a phase comparator coupled to said filters for providing said relative phase value, and a software routine within said processing means for determining said relative amplitude value from a pair of measured amplitude values supplied thereto, each of said measured amplitude values being indicative of electromagnetic field strength of energy received by an associated one of said pair of antennas.

10. The system according to claim 9 further comprising log amplification means coupled to said filters and threshold detection means coupled to said log amplification means.

11. The system according to claim 10 further including an analog to digital (A/D) converter coupled between said threshold detection means and said processing means and between said phase comparator and said processing means, said A/D converter converting a phase comparison value of said phase comparator to a first digital word indicative of said relative phase value, and converting a pair of output signals from said threshold detection means to a pair of digital words, said pair of digital words being indicative of said measured amplitude values.

12. The system according to claim 1 wherein said pair of antennas have broad antenna beams pointing at different azimuth directions to enable azimuth angular positions of aircraft to be measured over an azimuthal field of view of at least 90 degrees.

13. A system for measuring an angular direction of incoming electromagnetic energy, comprising:

an antenna assembly including at least two antennas for independently receiving the incoming electromagnetic energy, and an electronic memory having stored calibration data indicative of pre-measured radiation pattern characteristics of said antennas;

means coupled to said antennas for providing a frequency measurement of the incoming electromagnetic energy;

means coupled to said antennas for providing comparison parameters indicative of a difference between the electromagnetic energy independently received by said antennas, wherein said comparison parameters include a relative phase value and a relative amplitude value of the electromagnetic energy independently received by said antennas;

processing means, separate from said antenna assembly and coupled to said electronic memory, for retrieving said calibration data and determining said angular direction from said comparison parameters, said frequency measurement and said calibration data.

14. The system according to claim 13, further comprising means coupled to said pair of antennas and to said processing means for measuring the frequency of the electromagnetic energy received and wherein said processing means uses the measured frequency as a parameter in said determination of said angular direction.

15. The system according to claim 13 wherein said antennas have antenna beams pointing in different directions from the other.

16. The system according to claim 12 further including means coupled to said antennas and to said processing means for converting said electromagnetic energy independently received to digital words each indicative of a characteristic of the electromagnetic energy received by one of said antennas; and wherein said processing means includes said means for providing said one comparison parameter, said processing means comparing said digital words to determine said comparison parameter.

17. A method of measuring an angular direction of incoming electromagnetic energy, comprising:

providing at least two antennas disposed in a fixed relationship to one another;

measuring radiation patterns of said antennas, said radiation patterns including both phase patterns and amplitude patterns as a function of frequency and angle from a common reference plane of said antennas;

storing data indicative of said radiation patterns in an electronic memory;

independently receiving said incoming electromagnetic energy with each of said antennas;

detecting the frequency of the electromagnetic energy independently received by said antennas;

comparing the phase of the electromagnetic energy independently received by said two antennas to provide a relative phase value;

comparing the amplitude of the electromagnetic energy independently received by said two antennas to provide a relative amplitude value;

determining said angular direction from said frequency detected, said relative phase value, said relative amplitude value and said data in said electronic memory.

18. The method according to claim 17 wherein said radiation patterns comprise both relative phase and relative amplitude between radiated energy independently received by said two antennas as a function of frequency and angle from a common reference plane of said antennas.

19. The method according to claim 17 wherein said step of determining said angular direction comprises comparing said frequency detected, said relative amplitude value and said relative phase value with said stored data in said electronic memory to retrieve an angle value from said stored data corresponding to said frequency detected, said relative amplitude value and said relative phase value, whereby said angle value represents a measurement of said angular direction of the incoming electromagnetic energy free of ambiguities.

20. The method according to claim 17 wherein said data indicative of said radiation patterns includes a table of a computed distance between phase centers of said two antennas as a function of frequency and angle from a common reference plane, a table of relative amplitude slope as a function of frequency, said relative amplitude slope representing an incremental change in relative amplitude between said two antennas divided by an incremental change in said angle from a common reference plane, and wherein said step of determining said angular direction comprises retrieving one of said relative amplitude slope values from said electronic memory corresponding to said frequency detected; computing a coarse angle of arrival from said retrieved amplitude slope value; retrieving one of said distances between phase centers corresponding to said coarse angle of arrival from said data in said electronic memory; computing at least one fine angle of arrival from said frequency detected, said relative phase value and said distance between phase centers retrieved from said electronic memory; and determining a final measured angle of arrival by comparing said at least one of said fine angles of arrival with said coarse angle of arrival to resolve ambiguities in said angular direction.

* * * * *